United States Patent [19]

Tweed et al.

[11] Patent Number: 5,345,841
[45] Date of Patent: Sep. 13, 1994

[54] ELEVATED LOW IDLE FOR COASTING IN NEUTRAL

[75] Inventors: Lorne W. Tweed, Peoria; Timothy A. Cross, Metamora; William M. McClure, East Peoria; Brian T. Rolli, Peoria, all of Ill.

[73] Assignee: Caterpillar Inc., Peoria, Ill.

[21] Appl. No.: 955,632

[22] Filed: Oct. 2, 1992

[51] Int. Cl.$^5$ ............................................. B60K 41/04
[52] U.S. Cl. ..................................... 477/113; 477/111
[58] Field of Search ................. 74/857, 859, 860, 866; 364/424.1

[56] References Cited

U.S. PATENT DOCUMENTS

| | | | |
|---|---|---|---|
| 4,200,007 | 4/1980 | Espenschied et al. | 74/859 X |
| 4,474,153 | 10/1984 | Hanamoto et al. | 74/860 X |
| 4,481,844 | 11/1984 | Ironside et al. | 74/859 X |
| 4,747,326 | 5/1988 | Braun | 74/859 X |
| 4,750,598 | 6/1988 | Danno et al. | 74/859 X |
| 5,186,080 | 2/1993 | Simon | 74/859 X |

Primary Examiner—Rodney H. Bonck
Assistant Examiner—Daniel Wittels
Attorney, Agent, or Firm—R. Carl Wilbur

[57] ABSTRACT

The present invention provides a control which automatically elevates engine speed to a preselected value when the vehicle coasting in neutral above a preselected speed. In order to accomplish this objective, the engine controller is adapted to receive an actual gear ratio signal and a vehicle speed signal, If the vehicle is in neutral and engine speed is above a preselected threshold, the controller sets the desired engine speed to a preselected value which has been empirically determined to ensure sufficient transmission cooling and lubrication, Controlling to this speed also reduces transmission wear when the transmission is reengaged at high ground speeds.

14 Claims, 2 Drawing Sheets

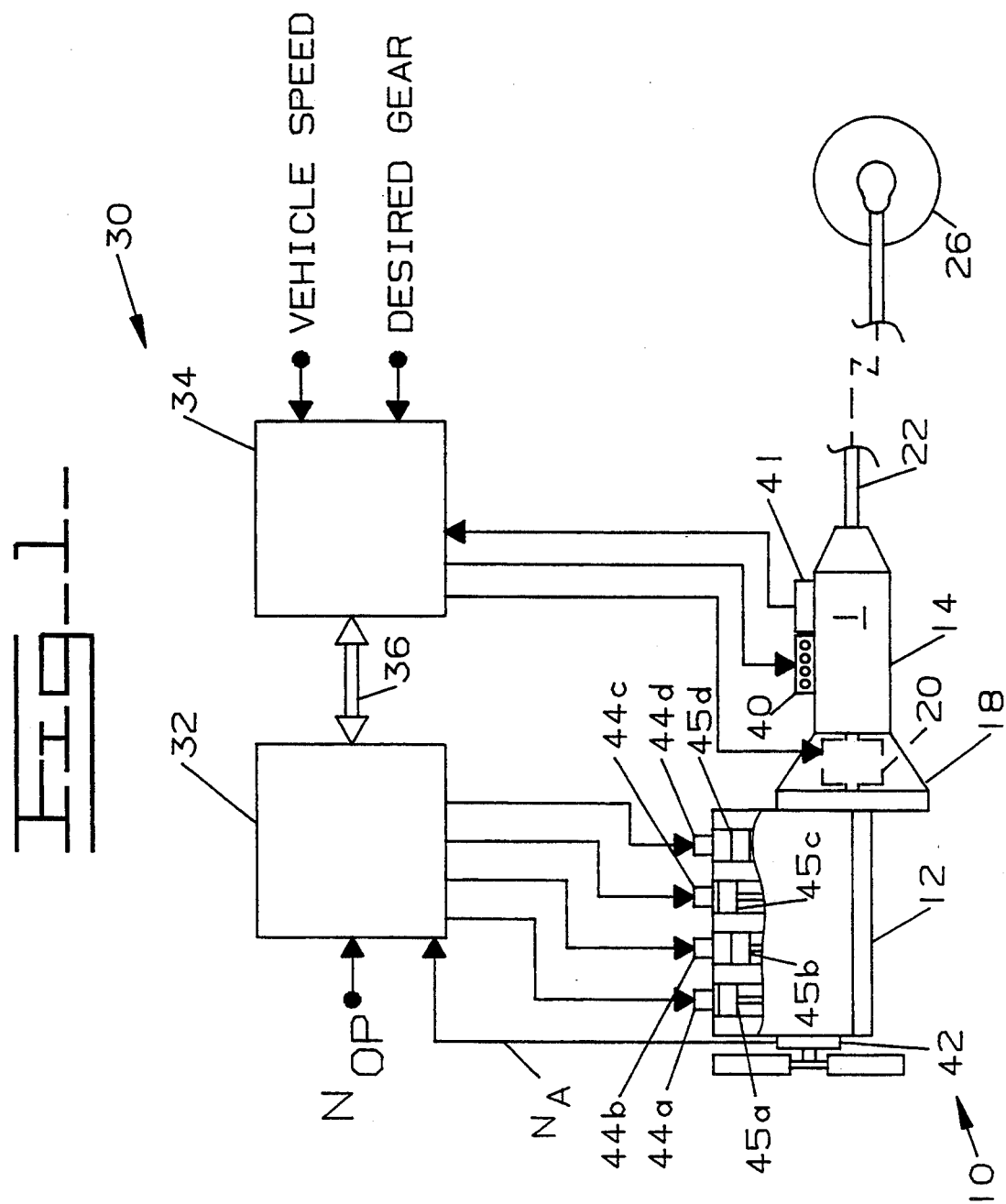

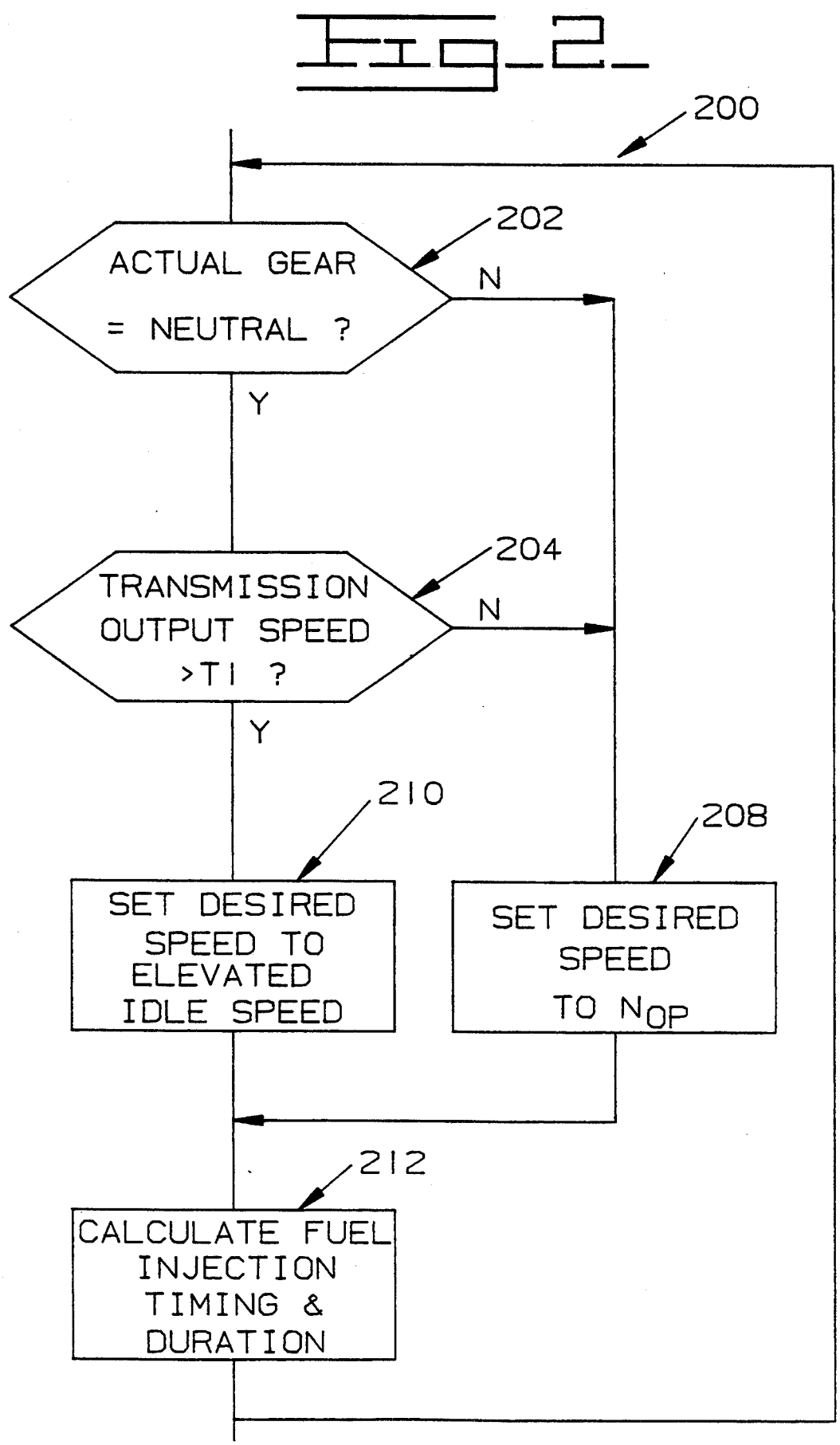

ELEVATED LOW IDLE FOR COASTING IN NEUTRAL

TECHNICAL FIELD

This invention relates generally to a method and apparatus for preventing engine and driveline damage and, more particularly, to a method and apparatus for controlling engine speed when vehicle is coasting in neutral.

BACKGROUND ART

In the field of construction vehicles, and in particular mining trucks, it has been found that vehicle operators commonly descend hills with the transmission in neutral and the accelerator pedal completely released. However, because the transmission's cooling and lubrication systems operate at rates controlled by engine speed, insufficient cooling and lubrication can result when the vehicle is operated in the above-described manner. Additionally, excessive transmission wear can occur when the operator reengages the transmission, due to the relatively high speed differential between the transmission's planetary elements.

The subject invention is directed towards addressing the above problems by providing a controller elevating engine speed to a predetermined level when the transmission is in neutral and the vehicle speed is above a preselected value.

DISCLOSURE OF THE INVENTION

In accordance with one aspect of the present invention, a control system is provided for a vehicle having an engine connected to and adapted to drive a transmission having a plurality of gear ratios. The control system includes a device for producing a gear ratio signal corresponding to the actual transmission gear ratio. A speed sensor is adapted to sense vehicle speed and produce a vehicle speed signal. A controller is adapted to receive the gear ratio signal and the vehicle speed signal, process the gear ratio signal to determine if the transmission is in neutral, compare the engine speed signal to a preselected threshold, and regulate engine speed to a preselected value when the transmission is in neutral and the vehicle speed is greater than or equal to the preselected threshold.

BRIEF DESCRIPTION OF THE DRAWING

FIG. 1 1 is a schematic illustration of a vehicle control system incorporating the present invention; and FIG. 2 is a software flowchart for practicing certain aspects of the present invention.

BEST MODE FOR CARRYING OUT THE INVENTION

Referring now to FIG. 1, the present invention will be described. FIG. 1 is a schematic illustration of a vehicle power plant 10 to which the present invention can be applied. The power plant 10 is equipped with an engine 12 and an automatic transmission 14. The present invention was developed for a transmission having neutral, a plurality of forward gear ratios and a reverse gear ratio; however, it can readily be adapted to different transmission configurations. Additionally, it should be appreciated that the present invention can be used in connection with manual transmissions. The input of the transmission 14 is connected to and driven by the engine 12 through a torque converter 18 equipped with a lockup clutch 20. The output of the transmission 14 is connected to and adapted to rotatably drive a shaft 22. The shaft 22 is in turn connected to and adapted to drive a ground engaging wheel 26, thereby propelling the vehicle. In this manner, engine torque or power is transmitted to the wheel 26 with a predetermined speed ratio.

A lubrication pump (not shown) is connected to and driven by the engine at a speed proportional to engine speed. The lubrication pump is located inside the torque converter and is driven at a speed responsive to the torque converter input speed, i.e. engine speed. The lubrication pump circulates fluid through passages in the transmission 14 and torque converter 18, thereby lubricating and cooling all gears, bearings and seals in both the torque converter and the transmission.

A vehicle control system 30 includes engine and transmission controllers 32,34 which are embodied in separate microprocessors adapted to communicate via a data link 36. Numerous commercially available microprocessors can be adapted to perform the functions of the engine and transmission controllers, as would be apparent to one skilled in the art. However, preferably the microprocessors are series MC68HC11 as manufactured by Motorola, Inc. of Schaumburg, Ill. It should be appreciated that both controllers could readily be embodied in a single microprocessor without departing from the scope of the present invention.

The transmission controller 34 is adapted to receive inputs including a vehicle speed signal, and effect gear changes in the transmission 14 in response to the received signals and in accordance with a predetermined shifting strategy, as is common in the art. For this purpose, the transmission 14 is provided with upshift and downshift solenoids 40. The controller 34 selectively delivers control signals to these solenoids to initiate gear change operations. Actuation of one of the shift solenoids 40 displaces a rotary selector valve (not shown) to a position corresponding to the new gear. When the selector valve is repositioned in this manner, the transmission automatically disengages the old gear and engages the new gear, as is common in the art. The transmission controller 34 is also electrically connected to the lockup clutch 20 for controlling its engagement and disengagement during shifting in accordance with a preselected strategy.

A gear selector (not shown) is provided for indicating a desired transmission gear ratio and direction of travel. It should be appreciated that the gear selector can be embodied in any device or combination of devices capable of providing an electrical signal for indicating a desired gear ratio and direction of travel. For example, the gear selector can be in the form of movable lever having a neutral position and a plurality of forward gear positions and reverse position. A sensor (not shown), such as a switch or potentiometer, is adapted to sense the position of the gear selector and produce a desired gear signal responsive to the selector's position. The desired gear signal is supplied to the transmission controller 34, as indicated in FIG. 1. As vehicle speed increases, the transmission controller 34 effects gear shifting in accordance with the preset shift map until the desired gear is reached.

An actual gear sensor 41 is provided for sensing the actual transmission gear ratio and producing an actual gear ratio signal. Preferably, the sensor 41 is in the form of a combination of switches adapted to sense the position of the rotary selector valve and produce a unique code for each transmission gear ratio as would be appreciated by one skilled in the art. The transmission controller 34 has an input adapted to receive the actual gear ratio signal.

The engine controller 32 is adapted to receive operating parameters including an operator desired speed signal $N_{OP}$ and an actual engine speed signal $N_A$ and responsively regulate engine speed in a closed-loop control. For this purpose, the control system includes a pedal position sensor (not shown) which is adapted to produce an electrical signal responsive to the position of the accelerator pedal. One suitable position sensor for performing this function is disclosed in U.S. Pat. No. 4,915,075 which issued to Brown on Mar. 20, 1989. Additionally, the control system includes an engine sensor 42 which is adapted to sense engine speed and produce an engine speed signal. Preferably, the engine speed sensor 42 is in the form of a magnetic pick-up sensor adapted to produce a signal corresponding to the rotational speed of the engine 12. One suitable sensor is described in U.S. Pat. No. 4,972,332 which issued to Luebbering et al. on Nov. 20, 1990. The sensor disclosed therein is capable of determining the speed, angular position and direction of rotation of a rotatable shaft.

The engine controller 32 processes the received signals to produce a fuel injection control signal $I_{fuel}$ for regulating the fuel delivery to the engine in response to a difference (i.e., error) between the desired and actual engine speed signals and in accordance with horsepower map (not shown) as is common in the art. Preferably, actual engine speed is regulated into correspondence with the desired engine speed using a proportional-integral-differential (PID) control loop. While a PID loop is preferred, it should be appreciated that the present invention could readily be adapted for use with other control strategies such as a proportional-integral control.

The injection control signal is delivered to solenoid operated fuel injector units 44a–d associated with individual engine cylinders 45a–d (four shown for illustration purposes) of the engine 12. The duration of the injection control signal corresponds to the on-time of the solenoid, thereby controlling the duration for which the injector delivers 44 fuel to associated cylinder 45 during the combustion cycle. Solenoid operated fuel injectors of this type are well known in the art, and it is perceived that any of them can be used with the present invention. One suitable solenoid operated fuel injector is shown in U.S. Pat. No. 4,219,154 which issued Aug. 26, 1980 to Douglas A. Luscomb. It discloses a solenoid controlled, hydraulically actuated unit injector. Another suitable solenoid is shown in U.S. Pat. No. 4,653,455, issued Mar. 31, 1987 to Eblen et al. It discloses a solenoid controlled, mechanically actuated unit injector.

Normally the desired speed is set to the operator desired speed signal $N_{Op}$ as produced by the accelerator pedal sensor. However, during gear changes engine speed is regulated in response to a desired engine speed signal as produced by the transmission controller 34 and in accordance with a preselected strategy which is referred to as Control Throttle Shifting (CTS).

The CTS strategy limits engine speed during shifting so as to reduce the driveline torques and clutch thermal loads developed during shifting. In order to effect the CTS strategy, the transmission controller 34 includes a CTS map stored in its memory. For each gear change, the CTS map provides a CTS time delay (CTSDELAY), a CTS desired engine speed (CTSPEED), and a CTS duration (CTSDUR). CTSSPEED corresponds to the desired speed which the engine controller 24 is to use during the shift. CTSDELAY corresponds to a time delay between the start of a shift and the time at which the engine controller 24 is to start regulating the engine to CSTNA. This time is empirically determined and approximates the time required for the transmission to disengage the old gear. CTSDUR corresponds to the time for which the engine controller 24 is to regulate engine speed to the CTSSPEED. This duration is empirically determined and approximates the time required to engage the new gear. These values are transmitted to the engine controller 24 via the data link 36 at the start of a shift.

When the engine controller 24 receives the CTS data, it sets a delay timer equal to CTSDELAY. When this timer times out, the desired engine speed is set to CTSSPEED. The engine controller 24 regulates engine speed to CTSSPEED for a time equal to CTSDUR. After this time elapses, control is returned to the accelerator pedal. Preferably, control is returned to the accelerator pedal in a ramped or step-wise fashion to prevent abrupt changes in engine speed. Since this strategy forms no part of the present invention, it is not explained in greater detail herein.

Referring now to FIG. 2, an embodiment of software for programming the engine controller 32 in accordance with certain aspects of the immediate invention is explained FIG. 2 is a flowchart illustrating a computer software program for implementing the preferred embodiment of the present invention. The program depicted in this flowchart is particularly well adapted for use with the MC68HC11 microprocessor and associated components described above, although any suitable microprocessor may be utilized in practicing an embodiment of the present invention. This flowchart constitutes a complete and workable design of the preferred software program, and has been reduced to practice on the series microprocessor system. The software program may be readily coded from this detailed flowchart using the instruction set associated with this system, or may be coded with the instructions of any other suitable conventional microprocessors. The process of writing software code from flowcharts such as these is a mere mechanical step for one skilled in the art.

FIG. 2 illustrates an Elevated Idle Routine 200 which can be used to program the engine controller 24 to elevate the engine speed when the vehicle is coasting in neutral above a preselected ground speed. Preferably, the routine continuously executes at a predetermined rate; however, it could easily be interrupt driven as would be apparent to one skilled in the art.

Initially, in the block 202, the controller 32 checks to determine if the transmission 14 is in neutral. More specifically, the transmission controller 34 is programmed to transmit an actual gear ratio signal on the data link 36. Preferably, this signal is produced in response to the actual gear ratio signal as produced by the gear ratio sensor 41. It should be appreciated that the present invention can be used with transmissions having a plurality of electro-hydraulic valves for controlling transmission gearing, as opposed to upshift and downshift solenoids. In such an application, the actual gear sensor could be eliminated and the actual gear signal could be produced in accordance with actuation of the shift solenoids.

When the block 202 executes, the engine controller will read the actual gear ratio signal from the data link 36. If the transmission 14 is not in neutral, control is passed to the block 208 where the desired engine speed ($N_D$) is set to the value of the operator desired speed ($N_{OP}$). However, if the transmission 14 is in neutral, control is passed to the block 204.

In the block 204, the engine controller 32 compares the vehicle speed signal to a predetermined threshold (T1). In the preferred embodiment, the predetermined threshold (T1) corresponds to a vehicle speed of 10 miles per hour. This value is purely a matter of design choice and should not be used to limit the scope of the invention. The engine controller 32 receives the value of the transmission output speed from the transmission controller 34 via the data link 36. This strategy is employed to reduce the number of redundant sensors and/or conditioning circuit required to sense the control parameters. If the vehicle speed is below the threshold (T1), control is passed to the block 208. However, if vehicle speed is above the threshold (T1), control is passed to the block 210 where the desired engine speed is set to a preselected value. In the preferred embodiment, the preselected value corresponds to an engine speed of 1300 rpm. This value is empirically determined as the speed required to ensure sufficient cooling and lubrication under all operating conditions. In the preferred embodiment, this speed is constant. However, it should be appreciated that this speed could readily be adapted to vary as a function of ground speed.

Control is then passed to the block 212 where the injection signal is calculated so as to regulate actual engine speed in accordance with the desired engine speed as set in either the block 208 or the block 210. By regulating engine speed in accordance with the control loop 200, sufficient cooling and lubrication is ensured when the vehicle is coasting in neutral at high ground speeds.

Other aspects, objects and advantages of this invention can be obtained from a study of the drawings, disclosure and the appended claims.

We claim:

1. A control system for a vehicle having an engine connected to and adapted to drive a transmission having a plurality of gear ratios, comprising:
   means for producing a gear ratio signal corresponding to the actual transmission gear ratio;
   a speed sensor adapted to sense vehicle speed and produce a vehicle speed signal;
   a first controller adapted to receive the gear ratio signal and the vehicle speed signal, process the gear ratio signal to determine if the transmission is in neutral, compare the vehicle speed signal to a preselected threshold, and regulate engine speed to a preselected value when the transmission is in neutral and the vehicle speed is greater than or equal to the preselected threshold.

2. A control system as set forth in claim 1, wherein the transmission is a manual transmission.

3. A control system as set forth in claim 1, wherein:
   a second controller adapted to a sense at least one operating parameter and produce a transmission control signal in response to the sensed parameter and in accordance with a predetermined shift map; and
   an apparatus for receiving the transmission control signal and automatically establishing a particular transmission gear ratio responsive to the transmission control signal; and
   wherein the gear ratio signal is produced in response to the transmission control signal.

4. A control system as set forth in claim 1, further including a sensor adapted to sense actual transmission gear ratio and produce the gear ratio signal.

5. A control system for a vehicle having an engine connected to and adapted to drive an automatic transmission having a plurality of transmission gear ratios, the control system further having an actuator for receiving transmission control signals and automatically establishing a particular gear ratio in response to a transmission control signal, comprising:
   a transmission controller adapted to sense at least one operating parameter and produce transmission control signals in response to the sensed parameter and in accordance with a predetermined shift map, the transmission controller further being adapted to produce an actual gear ratio signal;
   an engine speed sensor adapted to sense engine speed and produce an actual engine speed signal;
   means for producing a desired engine speed signal;
   a transmission output speed sensor, said transmission output speed sensor producing a transmission output speed signal; and
   an engine controller adapted to receive the actual gear ratio signal, the desired engine speed signal, the actual engine speed signal, and the transmission output speed signal process the gear ratio signal to determine if the transmission is in neutral, compare the transmission output speed signal to a preselected threshold, regulate engine speed in response to the desired engine speed signal if the transmission is not in neutral or if the transmission output speed signal is less than the preselected threshold, and regulate engine speed to a preselected value when the transmission is in neutral and the transmission control output signal is greater than or equal to the preselected threshold.

6. A control system as set forth in claim 5, wherein the transmission and engine controllers are embodied in separate microprocessors electrically connected by a data link.

7. A control system as set forth in claim 6, wherein the transmission controller produces the actual gear ratio signal in response to the transmission control signal.

8. A control system as set forth in claim 6, further including:
   a sensor adapted to sense actual transmission gear ratio and produce a gear ratio signal; and
   wherein the transmission controller is adapted to receive the gear ratio signal from the sensor and transmit said gear ratio signal engine controller via the data link.

9. A method of controlling an engine connected to and adapted to drive a transmission having a plurality of gear ratios, comprising:
   sensing the transmission gear ratio and producing a gear ratio signal;
   sensing vehicle speed and producing a vehicle speed signal;
   processing the gear ratio signal to determine if the transmission is in neutral;

comparing the vehicle speed signal to a preselected threshold; and regulating engine speed to a preselected value when the transmission is in neutral and the vehicle speed is greater than or equal to the preselected threshold.

10. A method of controlling an engine connected to and adapted to drive a transmission having a plurality of gear ratios, comprising:

sensing the transmission gear ratio and producing a gear ratio signal;

sensing vehicle speed and producing a vehicle speed signal;

processing the gear ratio signal to determine if the transmission is in neutral;

comparing the vehicle speed signal to a preselected threshold;

regulating engine speed in response to a desired engine speed signal if the transmission is not in neutral or if vehicle speed is above the preselected threshold; and regulating engine speed to a preselected value if the transmission is in neutral and the vehicle speed is greater than or equal to the preselected threshold.

11. A control system for a vehicle having an engine connected to and adapted to drive an automatic transmission having a plurality of transmission gear ratios, the control system further having an actuator for receiving transmission control signals and automatically establishing a particular gear ratio in response to a transmission control signal, comprising:

a transmission controller adapted to sense at least one operating parameter and produce transmission control signals in response to the sensed parameter and in accordance with a predetermined shift map, the transmission controller further being adapted to produce an actual gear ratio signal;

an engine speed sensor adapted to sense engine speed and produce an actual engine speed signal;

means for producing a desired engine speed signal;

means for producing a vehicle speed signal; and an engine controller adapted to receive the actual gear ratio signal, the desired engine speed signal and the vehicle speed signal, process the gear ratio signal to determine if the transmission is in neutral, compare the vehicle speed signal to a preselected threshold, regulate engine speed in response to the desired engine speed signal if the transmission is not in neutral or if vehicle speed is less than the preselected threshold, and regulate engine speed to a preselected value when the transmission is in neutral and the vehicle speed is greater than or equal to the preselected threshold.

12. A control system as set forth in claim 11, wherein the transmission and engine controllers are embodied in separate microprocessors electrically connected by a data link.

13. A control system as set forth in claim 12, wherein the transmission controller produces the actual gear ratio signal in response to the transmission control signal.

14. A control system as set forth in claim 12, further including:

a sensor adapted to sense actual transmission gear ratio and produce the gear ratio signal; and wherein the transmission controller is adapted to receive the gear ratio signal from the sensor and transmit it to the engine controller via the data link.

* * * * *

UNITED STATES PATENT AND TRADEMARK OFFICE
CERTIFICATE OF CORRECTION

PATENT NO. : 5,345,841

DATED : September 13, 1994

INVENTOR(S) : Lorne W. Tweed et al.

It is certified that error appears in the above-identified patent and that said Letters Patent is hereby corrected as shown below:

Column 6, claim 8, line 58, after "signal", insert --to the--.

Signed and Sealed this

Twenty-eight Day of March, 1995

Attest:

BRUCE LEHMAN

*Attesting Officer*    Commissioner of Patents and Trademarks